United States Patent
Ingersoll et al.

(10) Patent No.: US 8,212,807 B2
(45) Date of Patent: *Jul. 3, 2012

(54) GEOSPATIAL DATA SYSTEM FOR SELECTIVELY RETRIEVING AND DISPLAYING GEOSPATIAL TEXTURE DATA BASED UPON USER-SELECTED POINT-OF-VIEW AND RELATED METHODS

(75) Inventors: Mark Allen Ingersoll, Palm Bay, FL (US); Frank Howard Evans, III, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 864 days.

This patent is subject to a terminal disclaimer.

(21) Appl. No.: 11/847,510

(22) Filed: Aug. 30, 2007

(65) Prior Publication Data

US 2009/0058854 A1    Mar. 5, 2009

(51) Int. Cl.
*G06T 15/10* (2011.01)

(52) U.S. Cl. ........ 345/419; 345/423; 345/427; 345/585; 345/587; 345/629; 382/100; 382/113; 382/154; 382/232; 382/260; 382/305; 701/3; 701/200; 702/5

(58) Field of Classification Search .......... 345/419, 345/427, 582, 587, 629, 423; 382/100, 113, 382/154, 232, 260, 294, 305, 285; 701/3, 701/200; 702/5
See application file for complete search history.

(56) References Cited

U.S. PATENT DOCUMENTS

| | | | |
|---|---|---|---|
| 4,940,972 A | 7/1990 | Mouchot et al. | 340/747 |
| 5,432,871 A | 7/1995 | Novik | 382/232 |
| 5,490,240 A | 2/1996 | Foran et al. | 395/130 |
| 5,566,073 A | 10/1996 | Margolin | 364/449 |
| 5,613,051 A | 3/1997 | Iodice et al. | 395/128 |
| 5,760,783 A | 6/1998 | Migdal et al. | 345/430 |
| 5,760,793 A | 6/1998 | Ellert et al. | 345/509 |
| 6,111,568 A | 8/2000 | Reber et al. | 345/327 |

(Continued)

FOREIGN PATENT DOCUMENTS

JP    2003/044879    2/2003

OTHER PUBLICATIONS

Shahabi et al., "GeoDec: Enabling Geospatial Decision Making"; IEEE 2006.*

(Continued)

*Primary Examiner* — Kimbinh T Nguyen
(74) *Attorney, Agent, or Firm* — Allen, Dyer, Doppelt, Milbrath & Gilchrist, P.A.

(57) ABSTRACT

A geospatial data system may include at least one geospatial database containing three-dimensional (3D) geospatial structure data and geospatial texture data associated with the geospatial 3D structure data. At least one geospatial data access device may also be included and comprise a display and a processor cooperating therewith for communicating remotely with the at least one geospatial database to retrieve and display a scene on the display based upon the 3D structure data and the geospatial texture data associated therewith. The geospatial data access device(s) may further comprise at least one user input device cooperating with the processor for permitting user selection of a point-of-view (POV) within the scene on the display with the POV determining revealed portions and obscured portions of 3D geospatial structures within the scene on the display. The processor may selectively retrieve geospatial texture data based upon the revealed portions and not the obscured portions.

24 Claims, 7 Drawing Sheets

U.S. PATENT DOCUMENTS

| | | | | |
|---|---|---|---|---|
| 6,111,583 | A | 8/2000 | Yaron et al. | 345/421 |
| 6,496,189 | B1 | 12/2002 | Yaron et al. | 345/428 |
| 6,654,690 | B2 | 11/2003 | Rahmes et al. | |
| 6,985,929 | B1* | 1/2006 | Wilson et al. | 709/217 |
| 7,127,453 | B1* | 10/2006 | Frazier et al. | 1/1 |
| 7,225,207 | B1* | 5/2007 | Ohazama et al. | 1/1 |
| 7,353,114 | B1 | 4/2008 | Rohlf et al. | |
| 7,373,612 | B2* | 5/2008 | Risch et al. | 715/850 |
| 7,457,706 | B2* | 11/2008 | Melero et al. | 702/5 |
| 7,643,673 | B2* | 1/2010 | Rohlf et al. | 382/154 |
| 2005/0012742 | A1 | 1/2005 | Royan | 345/419 |
| 2005/0270288 | A1 | 12/2005 | Arcas | 345/428 |
| 2006/0031372 | A1 | 2/2006 | Krishnan et al. | 709/207 |
| 2006/0176305 | A1 | 8/2006 | Arcas et al. | 345/248 |
| 2006/0239574 | A1 | 10/2006 | Brower et al. | 382/240 |
| 2007/0024612 | A1 | 2/2007 | Balfour | 345/419 |
| 2010/0104174 | A1* | 4/2010 | Rohlf et al. | 382/154 |

OTHER PUBLICATIONS

Kiwon Lee "3D Urban Modeling and Rendering with High Resolution Remote Sensing Imagery on Mobile 3D and Web 3D Environments". Published May 2007.*

Taubman et al., *Architecture, philosophy and performance of JPIP: Internet Protocol Standard for JPEG2000*, Visual Communications and Image Processing 2003, pp. 791-805.

Cohen-Or et al., *Deep Compression for Streaming Texture Intensive Animations*, SIGGRAPH, 1999, pp. 261-268.

Haist et al., *Adaptive Streaming of 3D-GIS Geometries and Textures for Interactive Visualization of 3D City Models*, AGILE 2006: Shaping the Future of Geographic Information Science in Europe, Atlanta GA, College of Geoinformatics, University of West Hungary, 2006, pp. 160-167.

*Lizard Tech Focuses on Emerging Technologies in the Geospatial Industry at GeoWeb 2006*, Jul. 19, 2006, press release available at www.lizardtech.com.

Gerlek, *Bringing JPEG 2000 into the GeoWeb*, Geospatial Solutions, Oct. 24, 2006, available at http://gismap.geospatial-solutions.com/gssgismap/.

Zanuttigh et al., *Greedy Non-Linear Approximation of the Plenoptic Function for Interactive Transmission of 3D Scenes*, IEEE International Conference on Image Processing, 2005, ICIP 2005, Publication Date: Sep. 11-14, 2005, vol. 1, pp. I-629-I-632.

Image Compressor Datasheet Dec. 15, 2006, available at www.ermapper.com.

Marvie et al., "Remote rendering of massively textures 3D scenes through progressive texture maps", Visualization, Imaging and Image Processing, vol. 2, Sep. 2003, pp. 756-761.

Magli et al, "Image compression practices and standards for geospatial information systems", IEEE International Geoscience and Remote Sensing Symposium, IEEE, vol. 1, Jul. 2003, pp. 654-656.

Lin et al., "3D model streaming based on JPEG 2000", IEEE Transactions on Consumer Electronics, IEEE, vol. 53, No. 1, Feb. 2007, pp. 182-190.

Lafruit et al, "View-dependent, scalable texture streaming in 3-D QoS with MPEG-4 visual texture coding", IEEE Transactions on Circuit and Systems, IEEE, vol. 14, No. 7, Jul. 2004, pp. 1021-1031.

Royan et al, "Network-based visualization of 3D landscapes and city models", IEEE Computer Graphics and Applications, IEEE, vol. 27, No. 6, Nov. 2007, pp. 70-74.

Voisard et al., "A database perspective on geospatial data modeling", IEEE Transactions on Knowledge and Data Engineering, IEEE, vol. 14, No. 2, Mar. 2002, pp. 226-243.

* cited by examiner

GEOSPATIAL DATA SYSTEM FOR SELECTIVELY RETRIEVING AND DISPLAYING GEOSPATIAL TEXTURE DATA BASED UPON USER-SELECTED POINT-OF-VIEW AND RELATED METHODS

FIELD OF THE INVENTION

The present invention relates to the field of modeling systems, and, more particularly, to geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, which have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR).

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

Nonetheless, topographical models are no longer reserved for advanced modeling systems such as those discussed above. Various Internet service providers such as Google™ and Microsoft® are looking to provide access to 3D topographical models over the Internet that show users how a city or location appears in as much realism as possible. This may advantageously help increase a user's awareness of a given area and provide an exploratory environment. Such companies are striving to provide environments that are easier to use, more realistic and ultimately more useful. Improving the user experience involves increasing the quality of the 3D environment in terms of better terrain, more highly detailed city/building models, and higher resolution imagery of the terrain and buildings.

However, one significant challenge is that, while the terrain and models are quite small in terms of their geometries or structure, the imagery and textures used to enhance the basic models are typically very large. Over a highspeed network, such as that found within most corporate networks, downloading models and textures from a local network server is relatively fast and therefore not particularly problematic. Over the Internet, however, downloading these quantities of data can be extremely slow and significantly diminish user experience because of the relatively limited bandwidth available.

Currently, several network-enabled 3D viewers exist that permit users to view models from a network or Internet server. These viewers include Google™ Earth, Microsoft® VirtualEarth, and NASA WorldWind. All viewers share the ability to view untextured building models with some varying degree of textured terrain. Textured models tend to be very rudimentary. Microsoft® VirtualEarth attempts to apply textures over their models, but the delay can be so long as to become unacceptable to users.

Various approaches have been developed for remotely accessing terrain data. One example is set forth in U.S. Pat. No. 6,496,189 to Yaron et al. This patent discloses a method of providing data blocks describing three-dimensional terrain to a renderer. The data blocks belong to a hierarchical structure which includes blocks at a plurality of different resolution layers. The method includes receiving from the renderer one or more coordinates in the terrain along with indication of a respective resolution layer, providing the renderer with a first data block which includes data corresponding to the coordinate(s) from a local memory, and downloading from a remote server one or more additional data blocks which include data corresponding to the coordinate(s) if the provided block from the local memory is not at the indicated resolution layer. Despite the existence of such approaches, further advancements may be desirable for remotely retrieving and displaying large amounts of geospatial data.

SUMMARY OF THE INVENTION

In view of the foregoing background, it is therefore an object of the present invention to provide a system and related methods for efficiently retrieving and displaying geospatial data.

This and other objects, features, and advantages are provided by a geospatial data system that may include at least one geospatial database containing three-dimensional (3D) geospatial structure data, and also containing geospatial texture data associated with the geospatial 3D structure data. The system may further include at least one geospatial data access device, which may comprise a display and a processor cooperating therewith for communicating remotely with the at least one geospatial database to retrieve and display a scene on the display based upon the 3D structure data and the geospatial texture data associated therewith. Moreover, the at least one geospatial data access device may further comprise at least one user input device cooperating with the processor for permitting user selection of a point-of-view (POV) within the scene on the display with the POV determining revealed portions and obscured portions of 3D geospatial structures within the scene on the display. Further, the processor may advantageously selectively retrieve geospatial texture data based upon the revealed portions and not the obscured portions of the 3D geospatial structures within the scene on the display.

More particularly, the geospatial texture data contained in the at least one geospatial database may be retrievable in successive additive layers of resolution, and the processor may therefore retrieve and display the geospatial texture data in successive additive layers of resolution in the scene on the display. Furthermore, the processor may prioritize retrieval and display of successive additive layers of resolution of associated geospatial texture data to different 3D geospatial structures within the scene on the display. By way of example, the processor may prioritize based upon relative distances of the 3D geospatial structures within the scene on the display. Also, the processor may prioritize based upon different relative areas of the 3D geospatial structures within the scene on the display.

The geospatial data system may further comprise a communications channel coupling the at least one geospatial database and the geospatial data access device. The communications channel may have a capacity insufficient to carry within a predetermined time all of the associated geospatial texture data for the 3D geospatial structures within the scene on the display. By way of example, the communications channel may comprise the Internet. Additionally, the at least one geospatial database and the at least one geospatial data access device may communicate using a streaming wavelet-based imagery compression protocol, such as the JPEG 2000 Interactive Protocol, for example.

A related geospatial data access method aspect may include storing 3D geospatial structure data and geospatial texture data associated with the geospatial 3D structure data in at least one geospatial database. The method may further include remotely retrieving the 3D structure data and the geospatial texture data associated therewith from the at least one geospatial database. Additionally, a scene is displayed on a display based upon the retrieved 3D structure data and the geospatial texture data associated therewith and also based upon a user selection of a point-of-view (POV) within the scene on the display with the POV determining revealed portions and obscured portions of 3D geospatial structures within the scene on the display. In particular, remotely retrieving may further comprise selectively retrieving geospatial texture data based upon the revealed portions and not the obscured portions of the 3D geospatial structures within the scene on the display.

A related computer-readable medium is also provided having computer-executable instructions for causing a computer to perform steps including remotely retrieving three-dimensional (3D) structure data and geospatial texture data associated therewith from at least one geospatial database, and displaying a scene on a display based upon the retrieved 3D structure data and the geospatial texture data associated therewith and also based upon a user selection of a point-of-view (POV) within the scene on the display. The POV may advantageously determine revealed portions and obscured portions of 3D geospatial structures within the scene on the display. Remotely retrieving may further comprise selectively retrieving geospatial texture data based upon the revealed portions and not the obscured portions of the 3D geospatial structures within the scene on the display.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
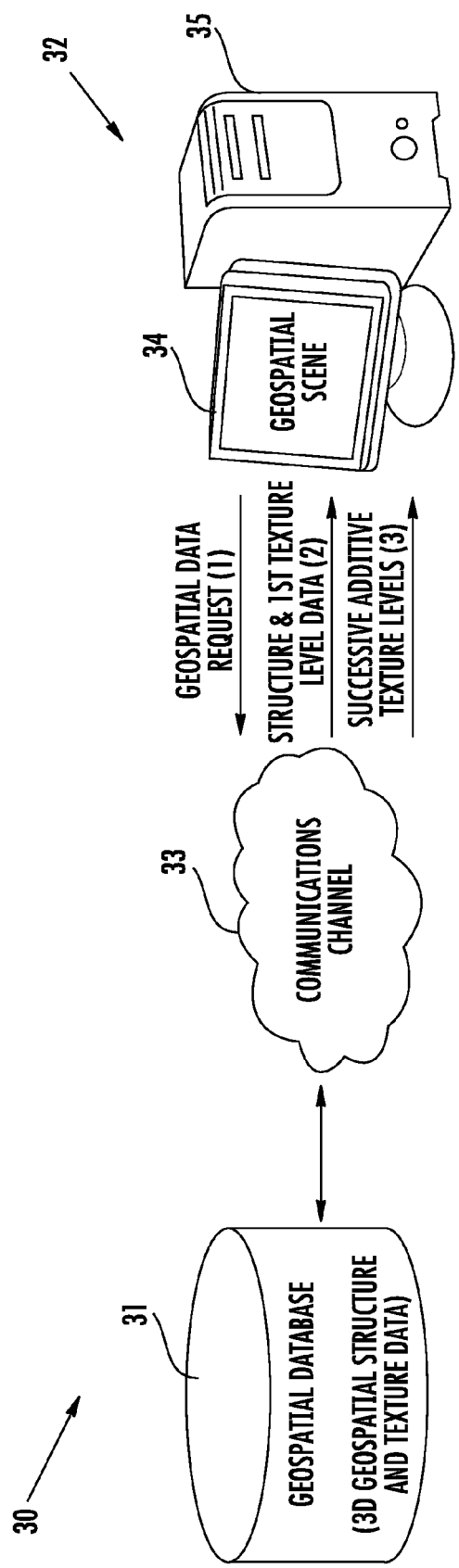
FIG. 1 is a schematic block diagram of a geospatial data system in accordance with the invention.
Figure 2:
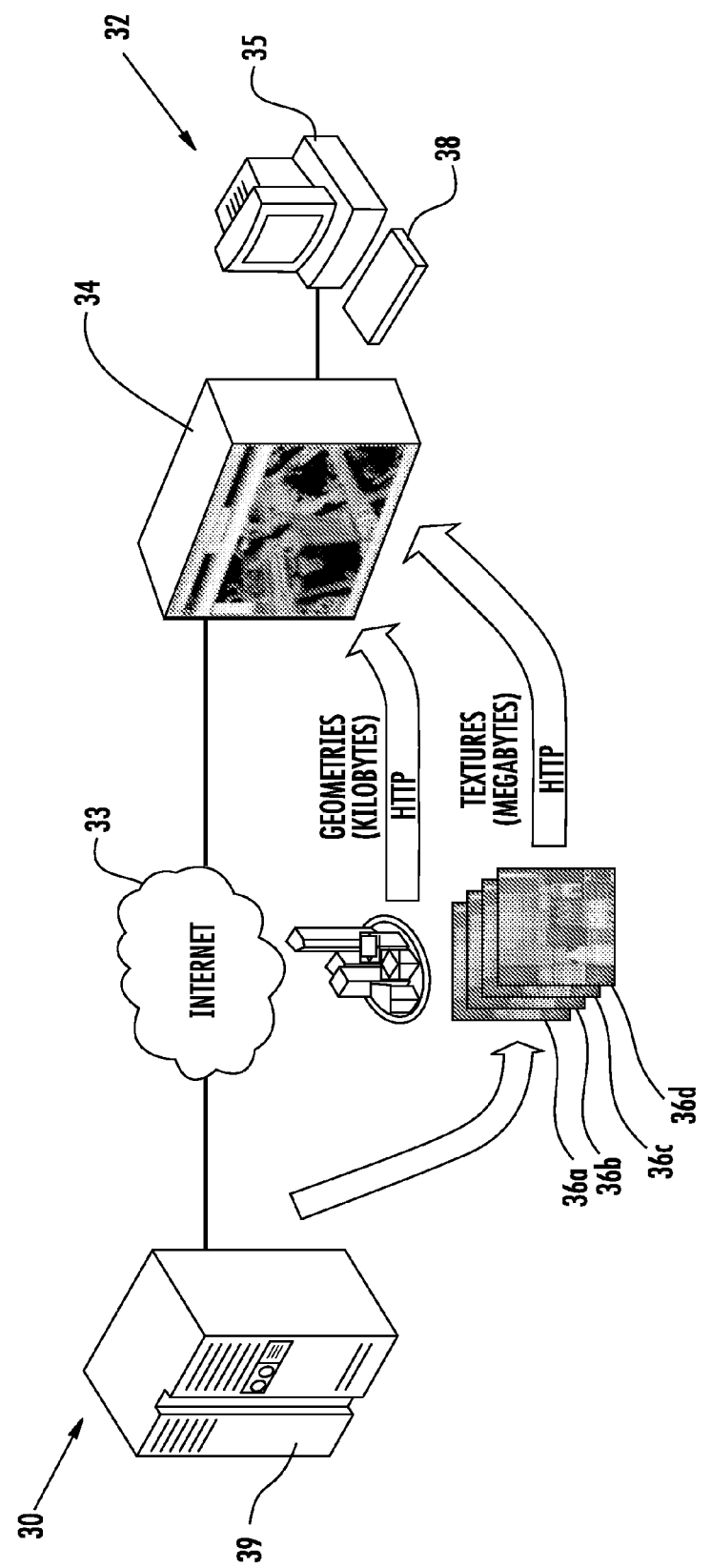
FIGS. 2 and 3 are schematic block diagrams of the geospatial data system of FIG. 1 in greater detail for a JPEG 2000 implementation.

Referring initially to FIGS. 1-6, a geospatial data system 30 and associated methods are now described. The system 30 illustratively includes one or more geospatial data storage devices 31 containing three-dimensional (3D) geospatial structure data, and also containing geospatial texture data associated with the geospatial 3D structure data and being retrievable in successive additive layers of resolution. As used herein, "structure" data includes man-made (e.g., buildings, bridges, etc.) data, and the 3D geospatial structure data may be in the form of a DEM, such as a tiled triangulated irregular network (T-TIN), for example. The geospatial texture data may be optical (i.e., image) data, for example, that is used to overlay or texture the DEM, etc., to make the image appear more realistic, as will be appreciated by those skilled in the art. In the example of FIG. 2, the geospatial data storage device 31 is implemented in an Internet model library server 39, as will be appreciated by those skilled in the art.

The system further illustratively includes one or more geospatial data access devices 32 for remotely accessing the geospatial data storage device(s) 31, such as via a wide area network 33, which in the illustrated embodiment is the Internet. The geospatial access device 32 illustratively includes a display 34 and a processor 35, such as the central processing unit (CPU) of a personal computer (PC) or Macintosh computer, for example, although other types of processors (workstations, personal digital assistant (PDA) devices, laptops, etc., may also be used). In the example illustrated in FIG. 2, the geospatial access device 32 is an Internet-enabled device.

Generally speaking, the processor 35 runs a viewer program 60 that cooperates with the display 34 for communicating remotely with the geospatial data storage device 31 to retrieve and display a scene on the display based upon the 3D structure data and the geospatial texture data associated therewith. As discussed above, when retrieving high volumes of geospatial texture data over a relatively limited bandwidth communications channel, such as the Internet (compared to a local high speed network connection, for example), this can make rendering of a geospatial scene or model on the display 34 very cumbersome and frustrating for the user. Stated alternatively, the communications channel (e.g., the Internet) may have a capacity insufficient to carry within a predetermined time (i.e., the time the processor 35 could otherwise render the scene) all of the associated geospatial texture data for the 3D geospatial structures within the scene on the display 34.

Typically, the transfer of 3D geospatial structure data will be relatively fast due to its smaller file size (e.g., on the order of kilobytes), and can therefore be substantially immediately sent and displayed upon request from the geospatial data access device 32. On the other hand, the geospatial texture data can be on the order of several megabytes or larger, for example, which delays the rendering of the geometry and the processor 35 otherwise waits until all data is retrieved to begin the rendering process.

Rather than compromise the geospatial texture data (and thus the ultimate image) by reducing the resolution, or using smaller size synthetic textures that can provide false or misleading images, the geospatial texture data is advantageously retrieved and displayed in successive additive layers 36a-36d of resolution (i.e., it is "streamed" in layers). This may advantageously make the user experience more interactive as model textures progressively sharpen as the user navigates through a geospatial model/scene, as will be appreciated by those skilled in the art.

More particularly, within the past several years, a wavelet-based imagery compression technology known as JPEG 2000 has been established and standardized that decreases the data required for a given image. A section of this specification enables imagery streaming, known as JPEG 2000 Interactive Protocol (JPIP) under part 9 of the specification, which is hereby incorporated herein in its entirety by reference. In the satellite imagery markets, this technique may allow users to effectively browse images that are several Gigabytes in size over connections as slow as 16 kB/sec.

Applicants have discovered that if the JPIP technique is applied to model textures, this effectively enhances the user experience by reducing the amount of data necessary to texture a model in varying resolutions. Streaming textures is a different approach than the current method of downloading full-resolution textures (or multiple textures of varying resolutions), which takes advantage of the more efficient and interactive protocol noted above.

In accordance with one embodiment, the effective user experience may include loading of untextured models, followed by textured models that progressively increase in resolution as the user approaches buildings or other objects within the scene (i.e., changes the point-of-view (POV)). In other embodiments, the viewer program may use whichever texture is available, and the user might not ever see an untextured model. For example, if the client-software requests both the structure and the texture data and the texture stream arrives first, the user would not see the untextured model. The viewer program will typically display the scene from an initial (startup) viewpoint (Block 61), and the user can change the POV using any suitable user input device, such as the illustrated keyboard 38, a mouse, joystick, etc. (Block 62). Objects that are farther away are only rendered using lower resolutions of the image (known as quality layers within the JPEG 2000 file), at Blocks 63-64 as discussed further below. As the user moves closer to a structure(s) (i.e., zooms in the POV), the structure/geometry data therefor is retrieved and displayed (Blocks 65-67), which may initially be without texture (or with only a first layer of texture). Successive additive layers of texture are then streamed in to increase the scene or model's appearance and displayed accordingly, as will be discussed further below. This technique may advantageously be leveraged over networks of modest bandwidth and in effect, makes very efficient use of network resources. As will be discussed further below, the additional texture data to be streamed may advantageously be selected based upon a position or relative distance of a structure within the scene, and/or based upon whether the data is revealed (i.e., visible) in the scene.

Figure 3:
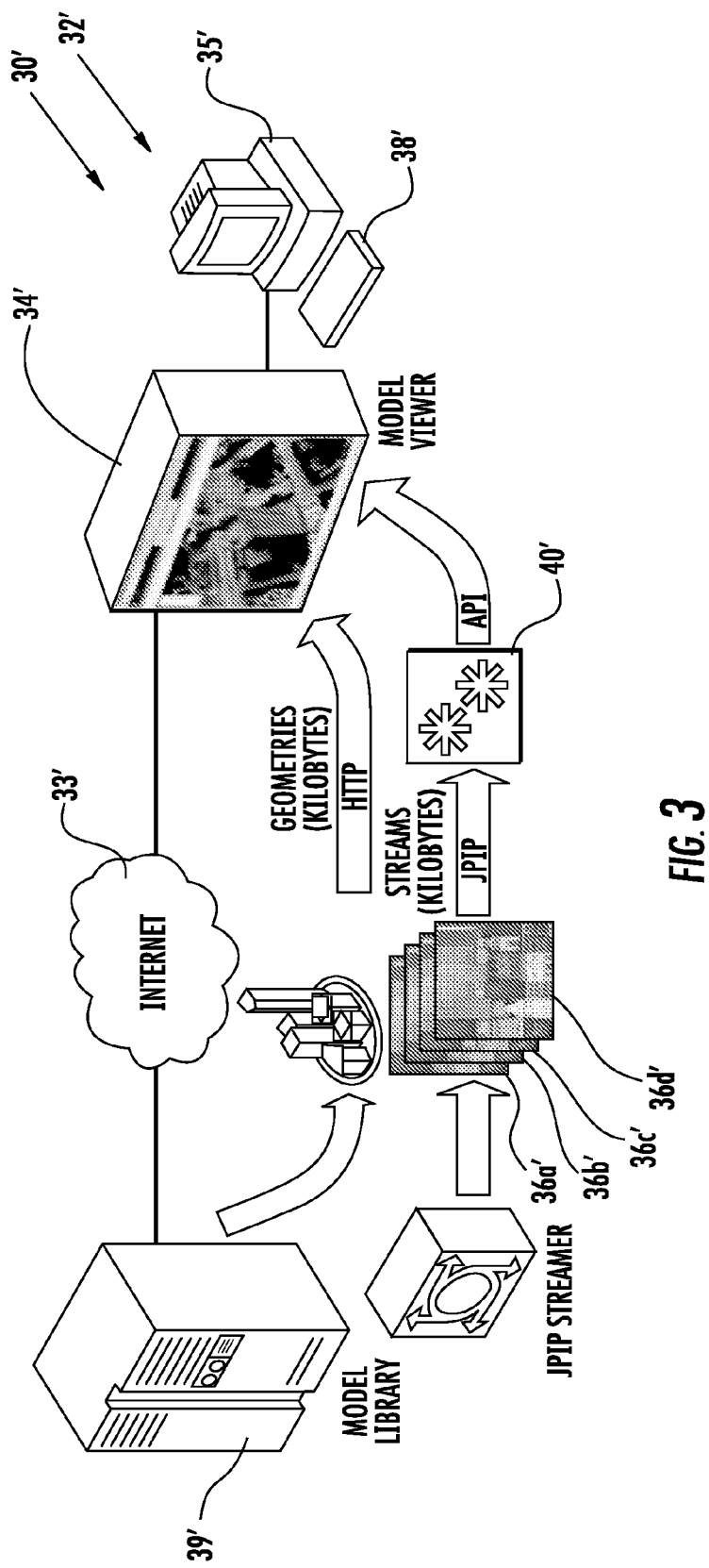

A system 30' implemented using JPIP is illustrated in FIG. 3. In this embodiment, geospatial texture data layers 36a'-36d' are stored in a data storage device 31' on the server 39' in a JPEG 2000 format that is arranged in a manner that permits efficient streaming by a JPIP streaming module 41'. As the rendering program on the processor 35' requests textures, a JPIP module 40' translates the requests into JPIP requests. Responses are returned in successive additive layers 36a'-36d', and each layer is converted to a texture.

Figure 4:
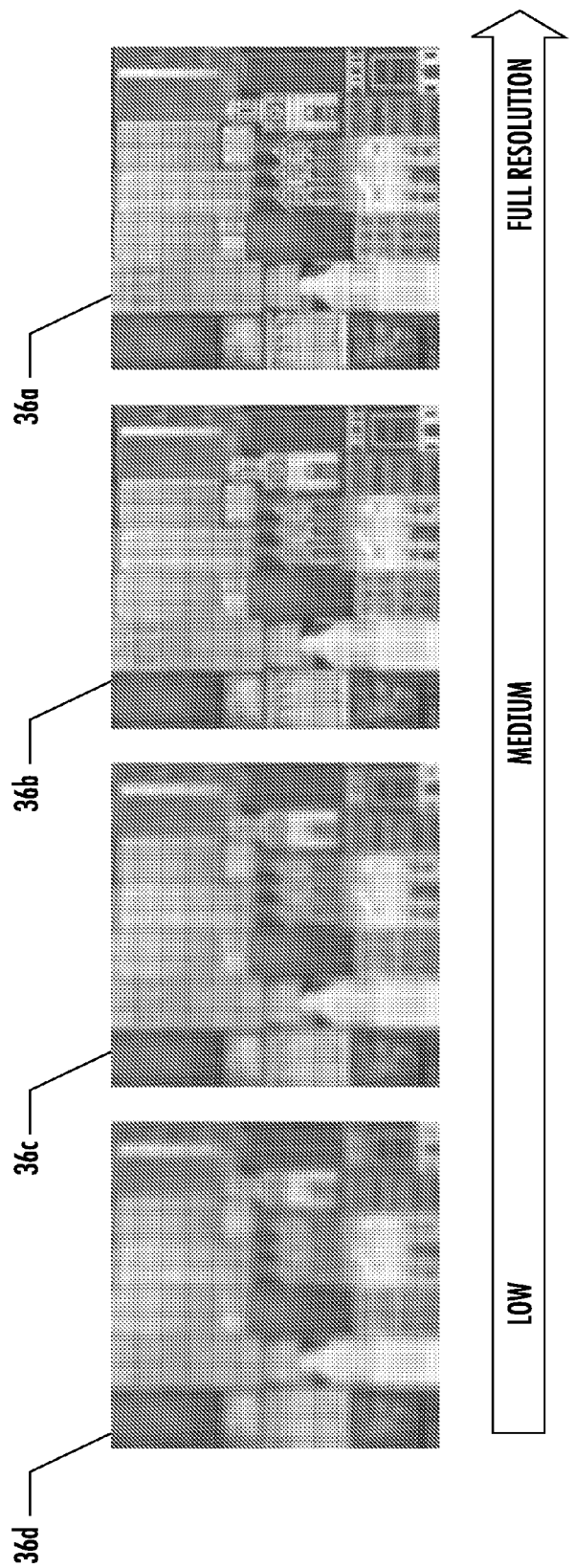
FIG. 4 is a series of geospatial texture images illustrating progressive texture data rendering of the system of FIG. 1.
Figure 5C:
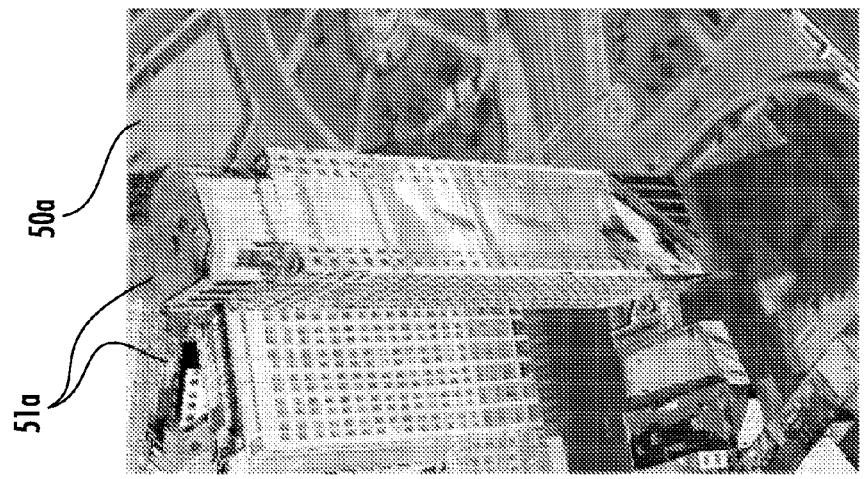
FIGS. 5A-5C are another series of geospatial texture images also illustrating progressive texture data rendering of the system of FIG. 1.
Figure 5B:
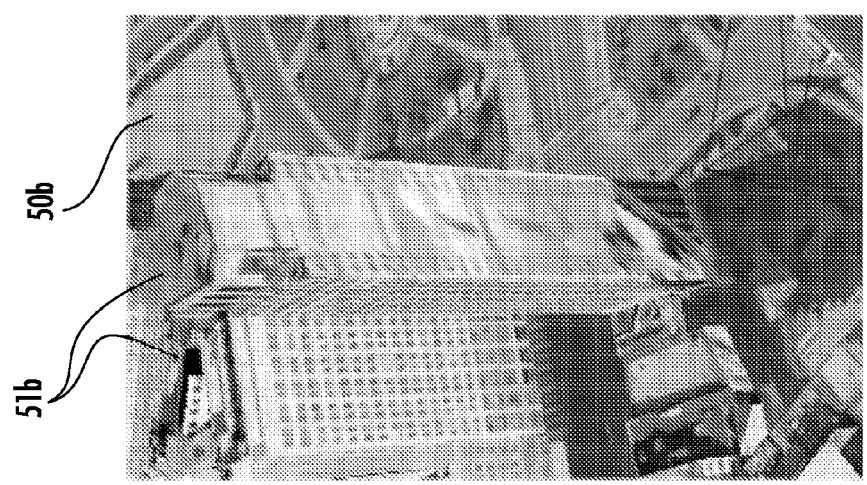
Figure 5A:
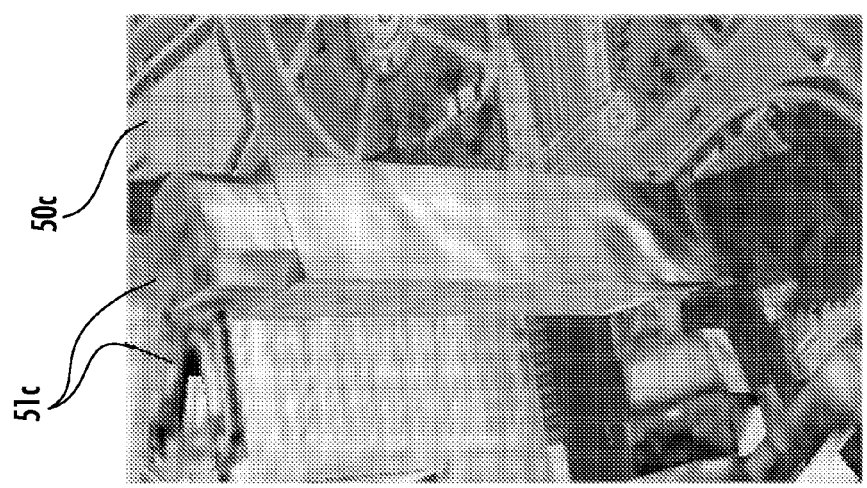
Figure 6:
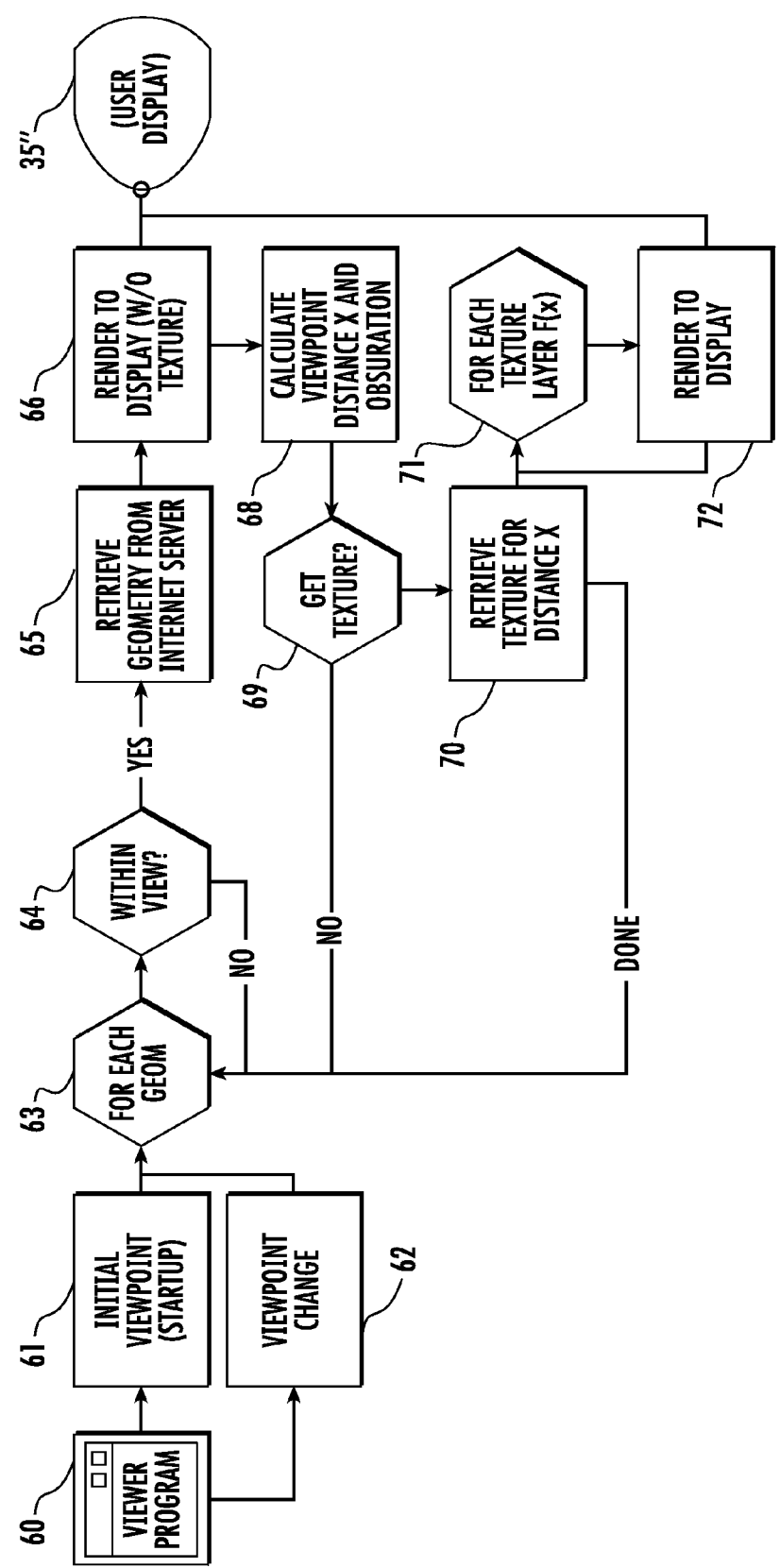
FIG. 6 is a system flow diagram illustrating method aspects of the invention.

A JPIP-aware model viewer can make successive texture requests, each time resulting in sharper and sharper textures, as seen in FIG. 4. JPEG 2000 files may be encoded using profiles that produce quality layers. In FIG. 4, each of the layers 36a-36d represents a different JPEG 2000 quality layer. Each quality layer contains a portion of each pixel's information, and each successive layer adds to the previous ones to provide progressively sharper pixels until the final layer contains the remaining information to complete the full resolution image, as shown. Another example is shown in FIGS. 5A-5C, in which three successive additive layers result in the illustrated buildings 51 going from having an obscured surface with little window or picture definition (51c), to the well defined buildings 51a having relatively crisp window delineation and a visible image of whales on the side of one of the buildings.

Figure 7:
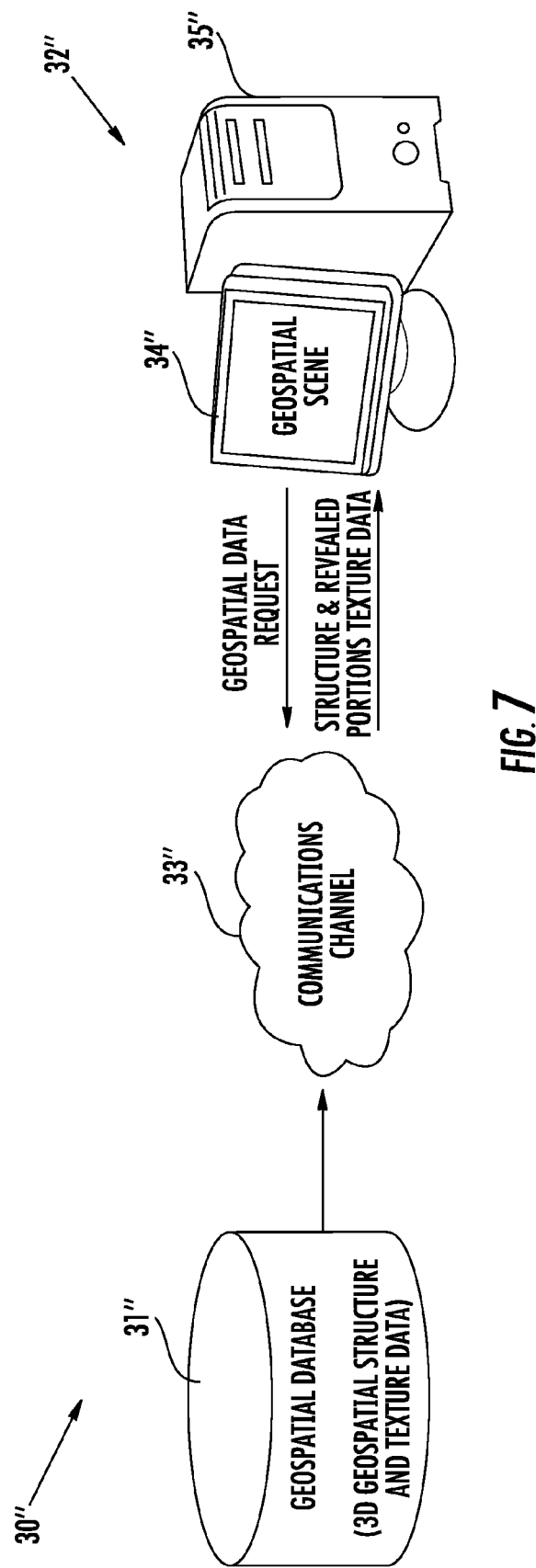
FIG. 7 is a schematic block diagram of an alternative embodiment of the system of FIG. 1.

Referring additionally to FIG. 7, in accordance with another advantageous aspect models/scenes that are farther away from the user need only receive lower resolution textures, and the user is advantageously not burdened with downloading unnecessary texture data. That is, the processor 35" may advantageously prioritize retrieval and display of successive additive layers of resolution of geospatial texture data to different 3D geospatial structures within the scene on the display 34" (Blocks 68-72). By way of example, the processor 35" may prioritize based upon relative distances of the 3D geospatial structures within the scene on the display, and/or based upon different relative areas of the 3D geospatial structures within the scene on the display. Thus, for example, buildings/terrain that are closer in the scene would receive more successive additive layers of resolution than buildings/terrain that is farther away in the scene.

Moreover, as will be appreciated by those skilled in the art, as the user selects a given POV within the scene, the POV will determine revealed portions (e.g., front of buildings) and obscured portions (e.g., back of buildings) of 3D geospatial structures and/or terrain within the scene on the display. Further, the processor 35" may advantageously selectively retrieve geospatial texture data based upon the revealed portions and not the obscured portions of the 3D geospatial structures within the scene on the display 34". Thus, further bandwidth savings are provided by not downloading portions of the scene that are not going to be displayed on the display 34" anyway from the given POV.

The invention may also be embodied in a computer-readable medium having computer-executable instructions for causing a computer, such as the processor 35, to perform the steps/operations set forth above, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial data system comprising:
   at least one geospatial database containing three-dimensional (3D) geospatial structure data, and containing geospatial texture data associated with the geospatial 3D structure data; and
   at least one geospatial data access device comprising a display and a processor cooperating therewith and configured to communicate remotely with said at least one geospatial database to retrieve and display a scene on said display based upon the 3D structure data and the geospatial texture data associated therewith;
   said at least one geospatial data access device further comprising at least one user input device cooperating with said processor and configured to permit user selection of a point-of-view (POV) within the scene on said display determine whether portions of the scene are revealed or obscured on said display based upon the POV and prioritize revealed portions for retrieval and display prior to the obscured portions.

2. The geospatial data system of claim 1 wherein the geospatial texture data contained in said at least one geospatial database is retrievable in successive additive layers of resolution; and wherein said processor is configured to retrieve and display the geospatial texture data in successive additive layers of resolution in the scene on said display.

3. The geospatial data system of claim 1 wherein said processor is configured to prioritize retrieval and display of successive additive layers of resolution of associated geospatial texture data to different 3D geospatial structures within the scene on said display.

4. The geospatial data system of claim 3 wherein said processor is configured to prioritize based upon relative distances of the 3D geospatial structures within the scene on said display.

5. The geospatial data system of claim 3 wherein said processor is configured to prioritize based upon different relative areas of the 3D geospatial structures within the scene on said display.

6. The geospatial data system of claim 1 further comprising a communications channel coupling said at least one geospatial database and said geospatial data access device; and wherein said communications channel has a capacity insufficient to carry within a predetermined time all of the associated geospatial texture data for the 3D geospatial structures within the scene on said display.

7. The geospatial data system of claim 6 wherein said communications channel comprises the Internet.

8. The geospatial data system of claim 1 wherein said at least one geospatial database and said at least one geospatial data access device are configured to communicate using a streaming wavelet-based imagery compression protocol.

9. The geospatial data system of claim 8 wherein the streaming wavelet-based imagery compression protocol comprises the JPEG 2000 Interactive Protocol.

10. A geospatial data access device for accessing at least one geospatial database containing three-dimensional (3D) geospatial structure data, and also containing geospatial texture data associated with the geospatial 3D structure data, the geospatial data access device comprising:
    a display;
    a processor cooperating with said display and configured to communicate remotely with the at least one geospatial database to retrieve and display a scene on said display based upon the 3D structure data and the geospatial texture data associated therewith; and
    at least one user input device cooperating with said processor and configured to permit user selection of a point-of-view (POV) within the scene on said display;
    said processor configured to determine whether portions of the scene are revealed or obscured on said display based upon the POV and prioritize revealed portions for retrieval and display prior to the obscured portions.

11. The geospatial data access device of claim 10 wherein the geospatial texture data contained in the at least one geospatial database is retrievable in successive additive layers of resolution; and wherein said processor is configured to retrieve and display the geospatial texture data in successive additive layers of resolution in the scene on said display.

12. The geospatial data access device of claim 10 wherein said processor is configured to prioritize retrieval and display of successive additive layers of resolution of associated geospatial texture data to different 3D geospatial structures within the scene on said display.

13. The geospatial data access device of claim 12 wherein said processor is configured to prioritize based upon relative distances of the 3D geospatial structures within the scene on said display.

14. The geospatial data access device of claim 12 wherein said processor is configured to prioritize based upon different relative areas of the 3D geospatial structures within the scene on said display.

15. A geospatial data access method comprising:
    storing three-dimensional (3D) geospatial structure data and geospatial texture data associated with the geospatial 3D structure data in at least one geospatial database;
    remotely retrieving the 3D structure data and the geospatial texture data associated therewith from the at least one geospatial database;
    displaying a scene on a display based upon the retrieved 3D structure data and the geospatial texture data associated therewith and also based upon a user selection of a point-of-view (POV) within the scene on the display
    determining whether portions of the scene are revealed or obscured on the display based upon the POV; and
    prioritizing revealed portions for retrieval and display prior to the obscured portions.

16. The method of claim 15 wherein the geospatial texture data contained in the at least one geospatial database is retrievable in successive additive layers of resolution; and wherein remotely retrieving and displaying comprise remotely retrieving and displaying the geospatial texture data in successive additive layers of resolution in the scene on the display.

17. The method of claim 15 further comprising prioritizing retrieval and display of successive additive layers of resolution of associated geospatial texture data to different 3D geospatial structures within the scene on the display.

18. The method of claim 17 wherein prioritizing comprises prioritizing based upon relative distances of the 3D geospatial structures within the scene on the display.

19. The method of claim 17 wherein prioritizing comprises prioritizing based upon different relative areas of the 3D geospatial structures within the scene on the display.

20. A non-transitory computer-readable medium having computer-executable instructions for causing a computer to perform steps comprising:
   remotely retrieving three-dimensional (3D) structure data and geospatial texture data associated therewith from at least one geospatial database;
   displaying a scene on a display based upon the retrieved 3D structure data and the geospatial texture data associated therewith and also based upon a user selection of a point-of-view (POV) within the scene on the display
   determining whether portions of the scene are revealed or obscured on the display based upon the POV; and
   prioritizing revealed portions for retrieval and display prior to the obscured portions.

21. The non-transitory computer-readable medium of claim 20 wherein the geospatial texture data contained in the at least one geospatial database is retrievable in successive additive layers of resolution; and wherein remotely retrieving and displaying comprise remotely retrieving and displaying the geospatial texture data in successive additive layers of resolution in the scene on the display.

22. The non-transitory computer-readable medium of claim 20 further comprising prioritizing retrieval and display of successive additive layers of resolution of associated geospatial texture data to different 3D geospatial structures within the scene on the display.

23. The non-transitory computer-readable medium of claim 22 wherein prioritizing comprises prioritizing based upon relative distances of the 3D geospatial structures within the scene on the display.

24. The non-transitory computer-readable medium of claim 22 wherein prioritizing comprises prioritizing based upon different relative areas of the 3D geospatial structures within the scene on the display.

* * * * *